(12) United States Patent
Berliner

(10) Patent No.: US 6,256,711 B1
(45) Date of Patent: Jul. 3, 2001

(54) METHOD FOR PURGING UNUSED DATA FROM A CACHE MEMORY

(75) Inventor: Brian Berliner, Colorado Springs, CO (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/221,378

(22) Filed: Dec. 28, 1998

Related U.S. Application Data

(62) Division of application No. 08/641,523, filed on May 1, 1996.

(51) Int. Cl.$^7$ ..................................................... G06F 12/00
(52) U.S. Cl. ........................... 711/135; 711/113; 711/121
(58) Field of Search ................................. 711/117, 119, 711/135, 121, 3

(56) References Cited

U.S. PATENT DOCUMENTS

| | | | |
|---|---|---|---|
| 4,264,953 | * 4/1981 | Douglas et al. | 711/3 |
| 5,363,496 | * 11/1994 | Kato et al. | 711/135 |
| 5,579,503 | * 11/1996 | Osborne | 711/121 |
| 5,604,882 | * 2/1997 | Hoover et al. | 711/121 |
| 5,787,466 | * 7/1998 | Berliner | 711/117 |

OTHER PUBLICATIONS

Cache Memory Book by Jim Handy (pp. 128–129, 258) Copyright 1993 by Academic Press, Inc.*

* cited by examiner

*Primary Examiner*—Matthew Kim
*Assistant Examiner*—Fred F. Tzeng
(74) *Attorney, Agent, or Firm*—Hogan & Hartson LLP

(57) ABSTRACT

An efficient method for purging cache memory sub-blocks within a cache memory block is disclosed. The method is particularly applicable to cache memories established on rotating magnetic media, such as a hard disk drive. The method is unique in that it requires absolutely no system overhead when the system is running and the cache is not completely full. When all sub-blocks within the cache memory have been filled, sophisticated, system resource-intensive algorithms are not employed to determine which is the oldest or the least frequently used sub-block of data. Instead, sub-blocks of data are removed in a pseudo-random manner until ample space is available within the cache.

14 Claims, 2 Drawing Sheets

METHOD FOR PURGING UNUSED DATA FROM A CACHE MEMORY

This application is a divisional of copending U.S. application Ser. No. 08/641,523 filed on May 1, 1996 by Brian Berliner for METHOD FOR PURGING UNUSED DATA FROM A CACHE MEMORY from which priority is claimed and which is hereby incorporated by reference in its entirety.

This application is related to U.S. application Ser. No. 08/640,760 filed on Apr. 1, 1996; to U.S. application Ser. No. 08/641,654 filed on May 1, 1996; to U.S. application Ser. No. 08/641,653 filed on May 1, 1996; to U.S. application Ser. No. 08/640,527 filed on May 1, 1996; and to U.S. application Ser. No. 08/639,531 filed on May 1, 1996, all assigned to Sun Microsystems, Inc., assignee of the present invention, the disclosures of which are herein incorporated by this reference.

BACKGROUND OF THE INVENTION

1. Field of the Invention

This invention relates to non-volatile caching systems for data processing systems, and methods for implementing such systems.

2. Description of Related Art

Caching has long been employed to increase performance of a relatively slow computer memory resource when a faster memory resource, which typically has a higher cost per stored bit, is available. Typically, a temporary memory block within the faster memory resource (i.e., a cache) is established for storing only a portion of the information stored within the slower memory resource. Rather than store within the faster memory resource an entire application program or an entire data file that may be resident on the slower memory resource, certain algorithms are employed to determine which portions of the program or data file are most likely to be accessed. When the system's central processing unit (CPU) calls a memory location that is not stored in the cache, the cache (if completely filled) must be at least partially overwritten with the required data from the slower memory resource. Likewise, when permanent changes are made to data, data in both the cache and the slower memory resource must be updated to reflect that change.

As this is written, there are roughly 150 million computers throughout the world capable of performing general business-related tasks. When the rapid proliferation of personal computers began in the early 1980s, nearly all of them were employed as stand-alone units. However, multi-user systems were soon developed. These early multi-user systems ran software written for the CP/M disk operating system, which had been written by Gary Kildall and was marketed by his company, Digital Research, Inc. The multi-user disk operating system MP/M supplied by Digital Research, Inc. connected several "dumb" terminals to a single microprocessor and a shared disk drive, while TurboDOS—a much more sophisticated product supplied by an unrelated company—utilized a master/slave arrangement much like the Local Area Networks (LANs) in use today.

Both the MP/M and the TurboDOS disk operating systems ran on computer systems based on either the Intel 8080 microprocessor or the Zilog Z-80 microprocessor. Neither of these early microprocessors could directly address more than 65,536 bytes of random-access memory. As a consequence of MP/M and TurboDOS requiring a minimum of about 50,000 bytes of random access memory, only about 15,000 bytes of addressable memory remained for application programs. As few application programs, other than simple word processors, required 15,000 bytes or less, the early multi-user systems were, for the most part, more intellectual curiosities than they were practical, general-use, multi-user data processing systems.

Distributed data processing (i.e., multiple LANs interconnected via a long-distance data link) using either MP/M or TurboDOS was even more hopeless, as it would have required loading a communication program into memory, in addition to the operating system, before application software could be loaded. However, with the introduction of IBM-compatible computers based on the Intel 80286 microprocessor, which was designed to address several megabytes of random-access memory, the development of practical LANs and distributed data processing systems became feasible. Although Novel Corporation initially captured a majority share of the LAN market, the number of networks utilizing LAN software from Microsoft Corp. has been growing.

Present-day LANs generally use a twisted wire pair or a coaxial cable to interconnect individual user computer systems to a server system. The interconnection of LANs is accomplished via telephone lines, special dedicated data lines, microwave, or satellite links. For acoustic links, each end of the link generally requires a modem. The other links typically utilize a "bridge" and a "router" at each end.

Distributed data processing networks and the LANs within those distributed networks can often benefit from caching. Typically, links between LANs of a distributed processing network are slower than the interconnections between the nodes (i.e., individual computers) of a LAN. Furthermore, though a distant memory resource (e.g. a disk drive on a distant server system) may be as fast or even faster than local memory resources, long distance interconnections over a data link can dramatically slow access time to that distant resource. Regardless of the type of link between the LANs of a distributed processing network, or between the nodes (i.e., individual systems) of a LAN, each data link has a given bandwidth which will permit only a finite amount of data to be simultaneously transferred over the link. Once the bandwidth is exceeded, as for example when more than a certain number of users are attempting to communicate over the same link (whether between LANs or within a LAN), response time over that link typically degrades as each user's request is delayed in order to evenly accommodate all competing requests. Consequently, caching of data read over a network can generally increase system performance both by reducing data link loading and by providing the end user with a cache of rapidly accessible data.

Within the last several years, compact disc read-only-memory devices (CD-ROMs) have become extremely popular due to the availability of low-cost, high-capacity compact disk storage media and relatively low cost CD-ROM readers (drives). In fact, nearly all new personal computers being sold in the U.S. include an installed CD-ROM drive. Although current CD-ROM media are capable of storing approximately 450–500 megabytes of data, access to that data is considerably slower than data stored on a modern hard disk drive. For example, the current standard for a high-performance CD-ROM drive, known as a "6X" drive is capable of reading, at most, about 600 kilobytes of data per second. A modern high-speed IDE hard disk drive, on the other hand, is capable of reading about six megabytes per second—roughly ten times the speed of a 6X CD-ROM drive. Thus, CD-ROM drive performance may also be greatly enhanced through caching.

Many graphical user interface (GUI) environments, such as Microsoft® Windows™ ver. 3.X, Microsoft Windows 95, Windows NT®, IBM Corporation's OS/2®, and Geoworks® have been developed over the years. Of the aforementioned products, only Windows NT and OS/2 are true operating systems, as Geoworks and Windows 3.x must be loaded and run under the venerable Microsoft MS-DOS operating system. Windows 95 is somewhat of a hybrid, as it also requires portions of MS-DOS for its operation. For the sake of simplicity, though, both Windows 3.X and Windows 95 are referred to hereinafter as operating systems.

As this is written, Microsoft Windows ver. 3.X is far and away the most used operating system, having been bundled with nearly every personal computer sold between 1989 and mid-1995. However, from the date of its release in 1995, the Microsoft Windows 95 operating system from Microsoft Corporation has been bundled with most new, high-performance personal computers. In less than a year, it has become the operating system of choice for most business applications, and is expected to rapidly supplant Windows 3.X as the most used operating system for personal computers. The potential exists for significantly increasing the performance of both CD-ROM drives and distributed processing networks operating under Windows 3.x and Windows 95 operating systems through caching.

SUMMARY OF THE INVENTION

Shortly after the release of Windows 95, Sun Microsystems, Inc. (hereinafter also "Sun") set about to create a network and CD-ROM caching product that runs under both Windows 3.X and Windows 95, is completely transparent to end-users, and works with a wide variety of file systems running under both Windows 3.X and Windows 95. In order to fulfill these requirements in its recently released caching product, Sun utilizes the services provided by the Installable File System Manager (IFSMGR) virtual device driver. This process is fully explained in related patent application Ser. No. 08/641,654, incorporated herein by reference. Briefly, the IFSMGR driver—through a "hooking" process—permits the caching product to view all file system input/output (I/O) requests and to take interim control of the I/O operation. Thus, the new caching product is effectively "layered" between the IFSMGR driver and the generic file system of Windows 95.

The caching product also fits the definition of a virtual device driver.

Sun's new caching product, which has been named "Solstice PC-CacheFS" (hereinafter "PC-CacheFS"), employs a block of readable, writable and erasable memory resident on rotating, magnetic-media (e.g., a hard-disk drive). As a performance enhancement, it may also employ a block of readable, writable and erasable memory in the random access memory (RAM). Each block of user-configurable cache memory—whether on rotating magnetic media or in RAM—is made up of a fixed quantity of cache memory sub-blocks.

When a system call for data from a distant network memory resource (e.g., a hard disk drive or CD-ROM connected to a server) or a local CD-ROM is made, an amount of data equivalent in size to a cache memory sub-block, which includes the data actually called for by the system, is read from the distant memory resource or local CD-ROM and written to a sub-block location within the cache memory. When data called for by the system has not been loaded into one of the sub-blocks within the cache, a miss is registered by the caching product. A miss requires a further access of the resource being cached and the writing of another sub-block-sized quantity of data to the cache memory block.

At some point, all sub-blocks within the cache will have been loaded and no additional space within the cache memory block remains for the writing of additional sub-blocks of data. Thus, at least one of the sub-blocks of data within the cache memory block must be purged to make room for a sub-block containing data called for by the system. This process of purging sub-blocks from the cache memory block is often called "garbage collecting", although it is more akin to garbage burning, as the purged data then exists only within the distant memory resource or local CD-ROM that is being cached.

The purging of sub-blocks with a cache memory is typically performed using an algorithm which determines a ranking for sub-blocks within the cache on the basis of either time since last use or frequency of use. Because caching is normally accomplished with semiconductor memory, housekeeping tasks such as the purging of cache sub-blocks can proceed rapidly. However, PC-CacheFS implements caching primarily on rotating magnetic media.

As the access time for fastest modern hard disk drives is typically about three orders of magnitude slower than the fastest semiconductor memory, the overhead required to maintain data tables for enabling either a least-recently-used (LRU) or a least-frequently-used (LFU) purging algorithm would slow the caching operation considerably, even when sub-blocks within the cache memory are not being purged. The user would notice an even greater degradation in system performance at purging time. In order to avoid significant reductions in system performance related both to overhead required for the implementation of LRU, LFU, and other similar algorithms and the purging operation itself, a new technique has been developed for use with Sun's PC-CacheFS caching product.

This invention includes an efficient method for purging cache memory sub-blocks within a cache memory block. The method is particularly applicable to cache memories established on rotating magnetic media. The method is unique in that it requires absolutely no system overhead when the system is running and the cache is not completely full. When all sub-blocks within the cache memory have been filled, sophisticated, system resource-intensive algorithms are not employed to determine which is the oldest or the least frequently used sub-block of data. Instead, sub-blocks of data are removed in a pseudo-random manner until ample space is available within the cache.

DETAILED DESCRIPTION OF PREFERRED EMBODIMENTS

The embodiments of the invention described herein may be implemented as logical operations in a distributed processing system having client and server computing systems. The logical operations of the present invention are implemented (1) as a sequence of computer implemented steps running on the computing system and (2) as interconnected machine modules within the computing system. The implementation is a matter of choice that is dependent on the performance requirements of the computing system implementing the invention. Accordingly, the logical operations making up the embodiments of the invention described herein are referred to variously as operations, steps or modules.

Figure 1:
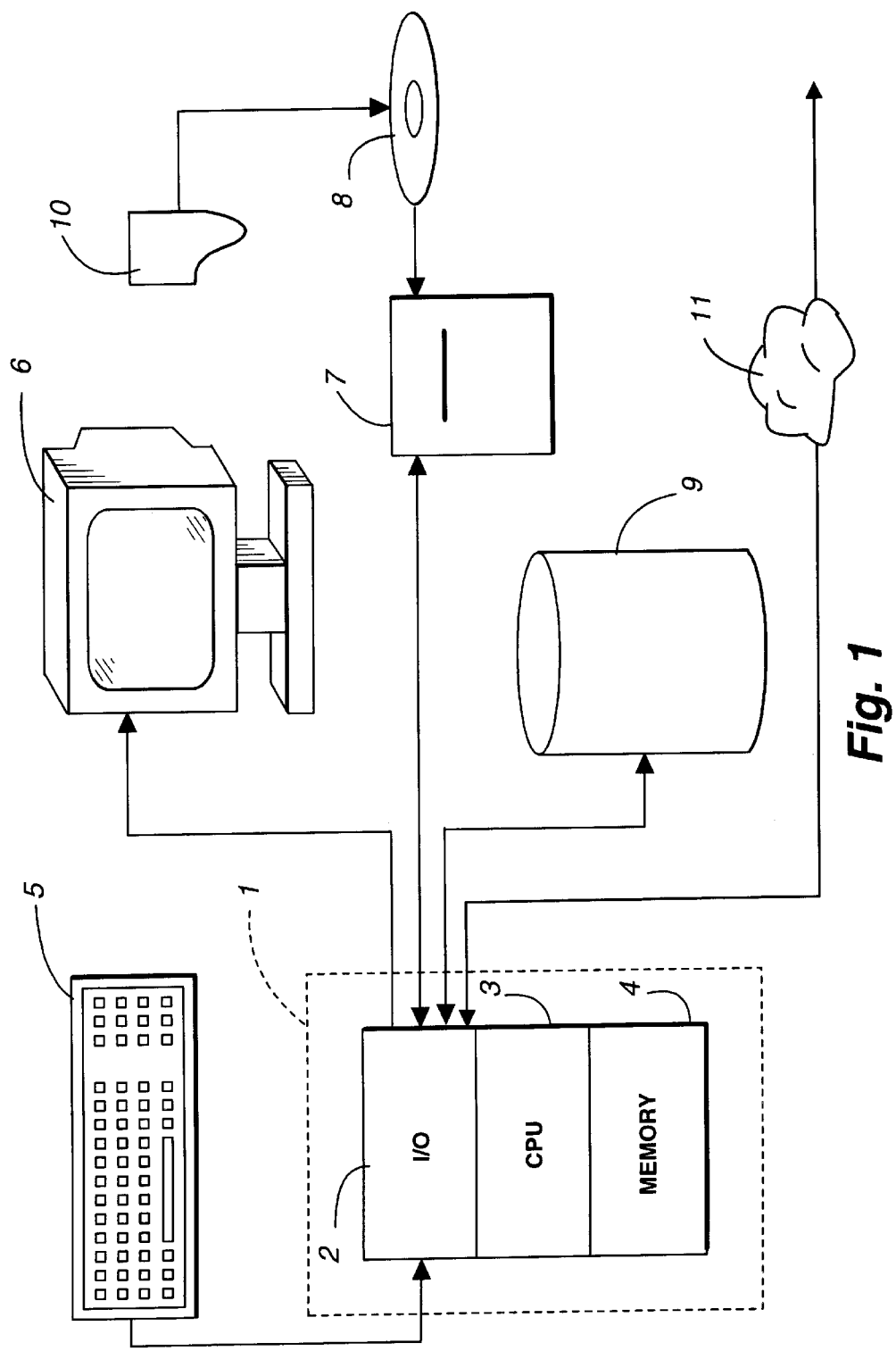
FIG. 1 illustrates a computing system for performing the computer implemented steps of the method in accordance with the invention.

The operating environment in which the present invention is used encompasses the general distributed computing system, wherein general purpose computers, workstations, or personal computers (hereinafter local nodes) are connected via communication links of various types, in a client-server arrangement, wherein programs and data, many in the form of objects, are made available by various members of the system. Some of the elements of a general purpose workstation computer are shown in FIG. 1, wherein a processor 1 is shown, the processor having an input/output (I/O) section 2, a central processing unit (CPU) 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. The computer program products containing mechanisms to effectuate the apparatus and methods of the present invention may reside in the memory section 4, or on a disk storage unit 9, or on the CD-ROM median 8 of such a system. Examples of such systems include SPARC systems offered by Sun Microsystems, Inc., personal computers offered by IBM Corporation and by other manufacturers of IBM-compatible personal computers, and systems running the UNIX operating system.

The new method for purging no longer used sub-blocks of data within a cache memory to make room new sub-blocks containing data required by the system is particularly applicable to cache memories established on rotating magnetic media such as hard disk drives. The method is unique in that it requires absolutely no system overhead when the system is running and the cache is not completely full. No system overhead is required because the new purging method does not utilize a purging algorithm which requires the caching program to maintain tables for keeping track of sub-blocks on the basis of recentness or frequency of use. When all sub-blocks within the cache memory have been filled, sub-blocks of data are removed in a pseudo-random manner until ample space is available within the cache.

Figure 2:
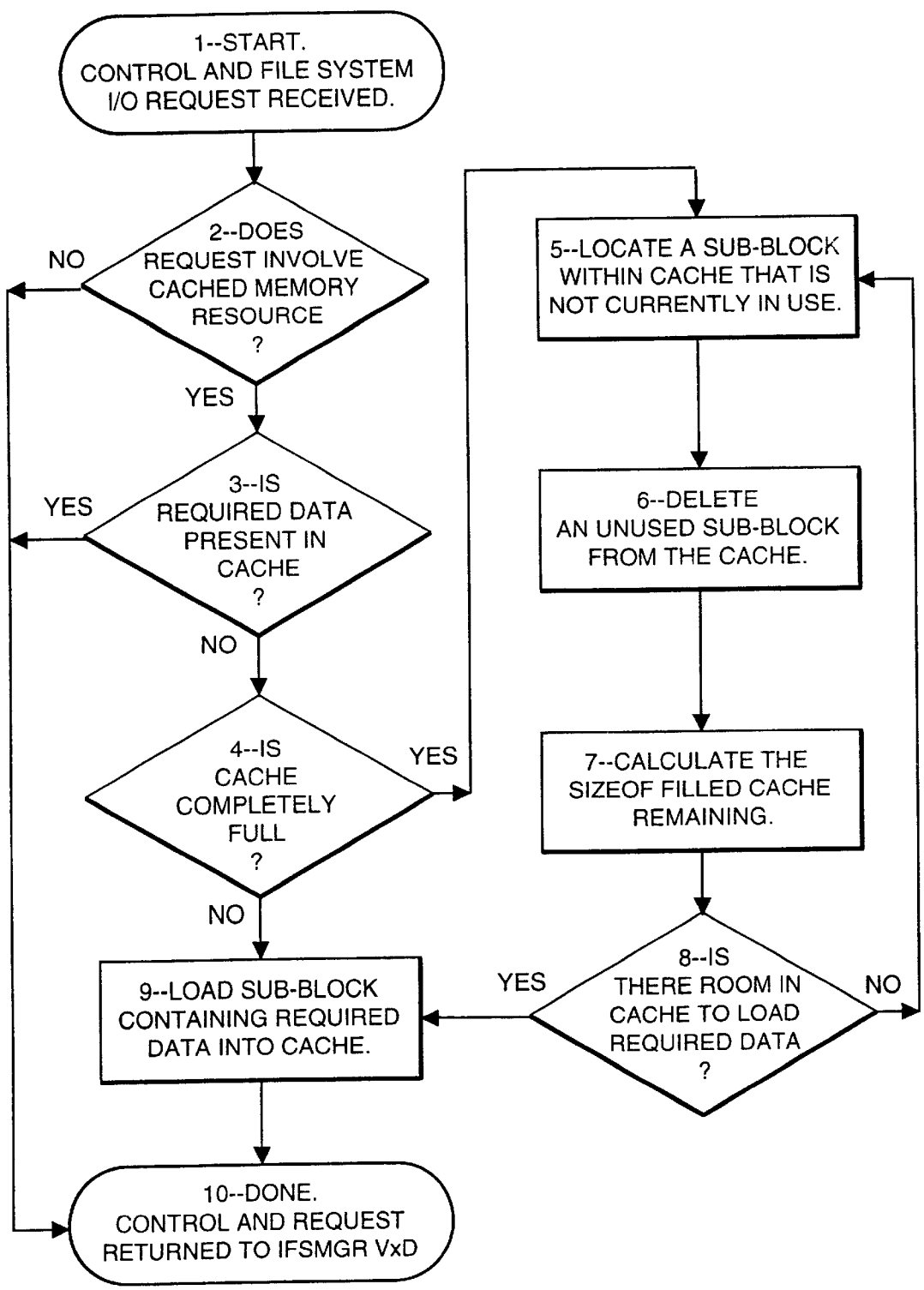
FIG. 2 is a flow chart depicting the steps utilized to implement the preferred embodiment of the cache purging method.

The pseudo-code flow chart of FIG. 2 illustrates the steps taken to implement a preferred embodiment of the new cache purging method. The purging method works in conjunction with the servicing of file I/O requests received by the caching program from the IFSMGR virtual device driver. The purging logic functions as follows:

(1) the caching virtual device driver is "hooked" by the IFSMGR virtual device driver and handed a file system I/O request.
(2) does the received file request involve data resident on a system memory resource which is to be cached?
 No: Goto Step (10).
 Yes: Goto Step (3).
(3) Is the data which satisfies the request present in a sub-block loaded in the cache?
 Yes: Goto Step (10).
 No: Goto Step (4).
(4) Is the cache completely full?
 Yes: Goto Step (5).
 No: Goto Step (9).
(5) Scan the hierarchical structure of cached sub-blocks without regard to age or frequency of use in order to locate in a psuedo-random manner a sub-block that is not currently being accessed by an application.
(6) Delete an unused sub-block from the cache.
(7) Calculate the size of the cache remaining.
(8) Does enough free space now exist in the cache to load the required data?
 Yes: Goto Step (9).
 No: Goto Step (5).
(9) Load a sub-block containing required data into the cache.
(10) Control returned to IFSMGR virtual device driver.

It should be noted that if identically-sized sub-blocks of data are always loaded into the cache, the flow scheme may be simplified by eliminating steps (7) and (8), as once a sub-block is erased, a new sub-block will always fit in the cache. An unused sub-block within the cache would simply be overwritten by a sub-block containing the data called for by the incoming file system I/O request.

While the invention has been particularly shown and described with reference to a preferred embodiment thereof, it will be understood by those skilled in the art that various other changes in the form and details may be made therein without departing from the spirit and scope of the invention.

What is claimed is:

1. A method for filling a cache memory in response to a request, the method comprising:
 determining an amount of memory space in the cache memory required to satisfy the request;
 psuedo-randomly identifying a portion of the cache memory;
 purging data stored in the identified portion of the cache memory to create free cache space; and
 repeating the identifying and purging until an amount of free cache space has been created in the cache memory at least as large as the amount of memory space required in the cache memory to satisfy the request wherein the identified cache memory portion is not being accessed by an application program undergoing execution.

2. The method of claim 1 wherein the identified cache memory portion has a size at least as large as the amount of memory space required to satisfy the request.

3. The method of claim 1 wherein the purging comprises removing contents of the identified cache memory portion from the cache memory.

4. A computer-implemented method for loading data into a cache memory in response to a request, the method being coded in the form of a computer-executable program instructions, the method comprising:
 determining an amount of memory space in the cache memory required to satisfy the request;
 psuedo-randomly identifying a portion of the cache memory;
 purging data stored in the identified portion of the cache memory to create free cache space; and
 repeating the identifying and purging until an amount of free cache space has been created in the cache memory at least as large as the amount of memory space required in the cache memory to satisfy the request wherein the identified portion of cache memory is not being accessed by an application program undergoing execution.

5. The computer-implemented method of claim 4 wherein the identified portion of cache memory has a size at least as large as the amount of memory space required to satisfy the request.

6. The computer-implemented method of claim 4 wherein the purging comprises removing contents of the identified cache memory portion from the cache memory.

7. A computer program product comprising computer readable code embodied in a propagating signal, the computer program product operative to load data into a cache memory in response to a request, the computer program product comprising:

computer-readable program code devices configured to cause a computer to effect determining an amount of memory space in the cache memory required to satisfy the request;

computer-readable program code devices configured to cause the computer to effect pseudo-randomly identifying a portion of the cache memory;

computer-readable program code devices configured to cause the computer to effect purging data stored in the identified portion of the cache memory to create free cache space; and computer-readable program code devices configured to cause the computer to effect repeating the identifying and purging until an amount of free cache space has been created in the cache memory at least as large as the amount of memory space required in the cache memory to satisfy the request.

8. In a Window-based computing system having an Installable File System Manager (IFSMGR) virtual device driver and a cache memory that includes a plurality of cache blocks each having a plurality of cache sub-blocks, a method for responding to a file Input/Output (I/O) request received by the IFSMGR virtual device driver, the method comprising:

transferring control of the file I/O request from the IFSMGR virtual device driver to a caching virtual device driver;

using the caching virtual device driver, psuedo-randomly selecting a cache sub-block that is not being accessed without regard to frequency with which cache sub-blocks are accessed or time elapsed since cache sub-blocks have been accessed; and overwriting the selected cache sub-block with data responsive to the file I/O request; and transferring control of the file I/O request back to the IFSMGR virtual device driver.

9. A method of responding to a request for data, the method comprising:

psuedo-randomly selecting an amount of cache memory space that is at least large enough to accommodate data responsive to the data request and is not being accessed; and writing the responsive data into the selected cache memory space;

wherein the act of psuedo-randomly selecting an amount of cache memory space that is at least large enough to accommodate data responsive to the data request comprises selecting a number of cache sub-blocks sufficient to accommodate the responsive data without regard to the frequency with which the selected cache sub-blocks are accessed or the time elapsed since the selected cache sub-blocks have been accessed, wherein the act of selecting a number of cache sub-blocks comprises: selecting a cache sub-block;

determining whether the number of selected cache sub-blocks is sufficient to accommodate the responsive data;

when the number of selected cache sub-blocks is not sufficient to accommodate the responsive data, selecting another cache sub-block; and repeating the acts of determining whether the number of selected cache sub-blocks is sufficient and, if not, selecting another cache sub-block until the number of selected cache sub-blocks is sufficient to accommodate the responsive data.

10. Computer code embodied in a computer-readable medium, the computer code comprising:

computer code for psuedo-randomly selecting an amount of cache memory space that is at least large enough to accommodate data responsive to a data request and is not being accessed without regard to frequency with which cache sub-blocks are accessed or time elapsed since cache sub-blocks have been accessed; and computer code for writing the responsive data into the selected cache memory space wherein the computer code comprises a virtual device driver.

11. A computer data signal embodied in a carrier wave and representative of computer code comprising:

computer code for psuedo-randomly selecting an amount of cache memory space that is at least large enough to accommodate data responsive to a data request and is not being accessed without regard to frequency with which cache sub-blocks are accessed or time elapsed since cache sub-blocks have been accessed; and computer code for writing the responsive data into the selected cache memory space wherein the computer code comprises a virtual device driver.

12. Computer code embodied in a computer-readable medium, the computer code comprising:

computer code for psuedo-randomly selecting an amount of cache memory space that is at least large enough to accommodate data responsive to a data request and is not being accessed, the selection of the cache memory space being performed without regard to the frequency with which the selected cache memory space is accessed or the time elapsed since the selected cache memory space has been accessed; and computer code for writing the responsive data into the selected cache memory space.

13. The computer code of claim 12 wherein the computer code comprises a virtual device driver.

14. The computer code of claim 12 wherein the computer code further comprises computer code for transferring control over the data request to an Installable File System Manager (IFSMGR) virtual device driver.

\* \* \* \* \*